June 12, 1956
W. L. PRINGLE
2,750,011
SEALED BRAKE
Filed Aug. 7, 1951
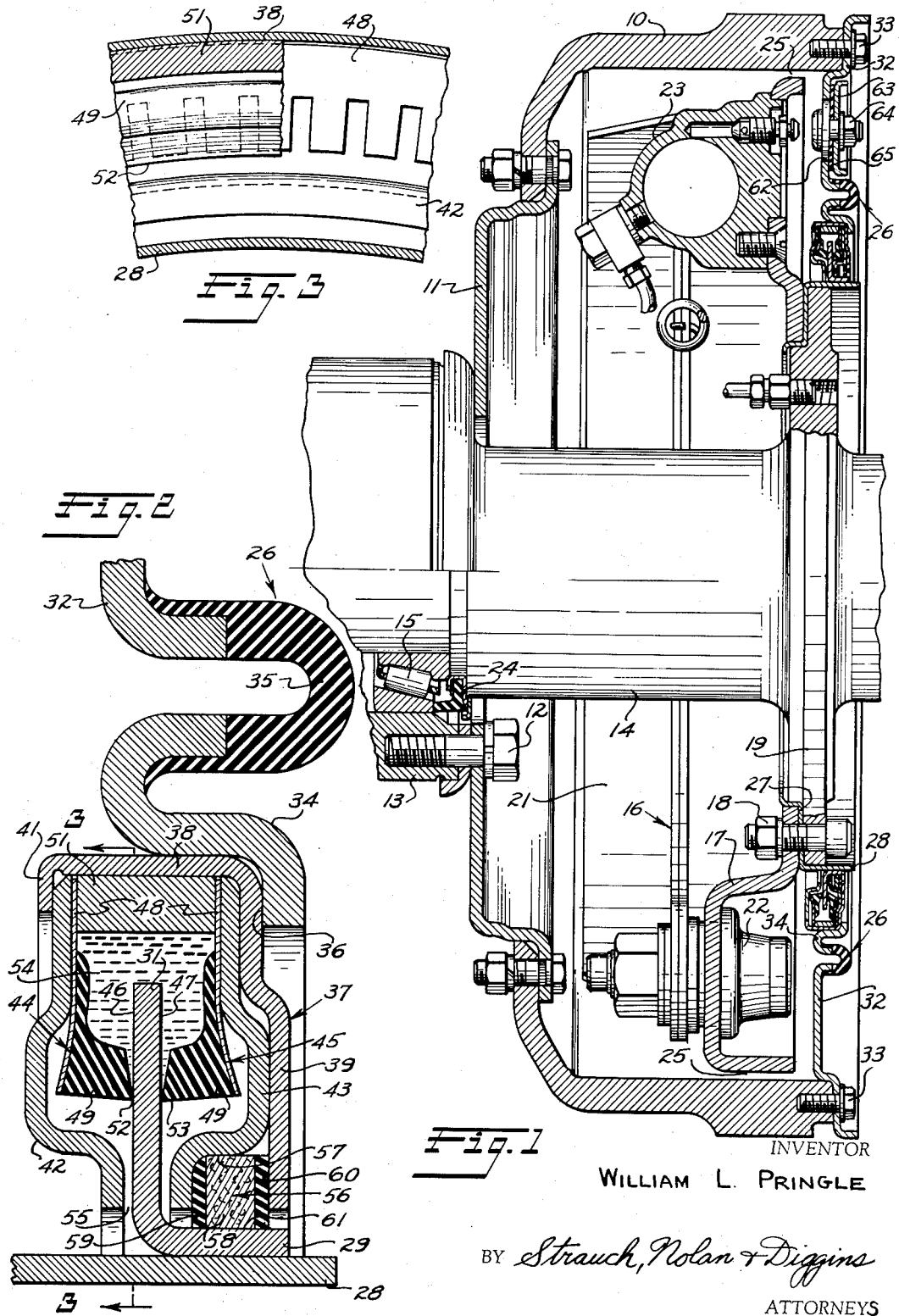
INVENTOR
WILLIAM L. PRINGLE
BY *Strauch, Nolan & Diggins*
ATTORNEYS

United States Patent Office 2,750,011
Patented June 12, 1956

2,750,011
SEALED BRAKE

William L. Pringle, Detroit, Mich., assignor, by mesne assignments, to Rockwell Spring and Axle Company, Coraopolis, Pa., a corporation of Pennsylvania Application August 7, 1951, Serial No. 240,685

6 Claims. (Cl. 188—218)

This invention relates to improved sealing devices adapted to be interposed between two relatively rotatable machine parts and more particularly to sealing devices adapted to prevent the entrance of dust, water, or other foreign material into a vehicle brake assembly.

While the disclosed embodiment of this invention is a sealed automotive brake, it is to be understood that the present invention is not limited to automotive brakes but, in general, is applicable to prevent passage of fluid between any two relatively rotating machine parts.

Automotive wheel brakes are usually so constructed that the clearance space between the relatively rotatable brake drum and brake mechanism mounting plate is shielded against the direct entrance of water or mud splashed upwardly by the wheels, but no positive seal is provided to prevent entrance of water or mud if the brake mechanism becomes submerged, as in crossing a stream. The brake mounting plate construction shown in United States Letters Patent No. 2,399,654, issued May 7, 1946, to H. W. Alden, et al., for Brake Mechanism, is typical of such prior art structure in conventional use. If such a brake mechanism becomes partly submerged during operation, water will enter and soak the brake lining so that the brake loses its effectiveness and, if the water carries sand or other abrasive material along with it, the life of the brake lining will be reduced considerably due to increased wear.

Many devices have been developed in the past in an effort to prevent the entry of water and abrasives into brake drums but most of such devices have proven impractical or ineffective and expensive. Some water proof brakes have been especially designed for particular applications but these do not permit the use of standard brake mechanisms or standard type disk wheels and have proved to be cumbersome, expensive and impractical. The prior solutions to this problem have always contemplated a completely redesigned brake mechanism rather than a sealed, fluid tight, conventional brake mechanism.

The major object of this invention is to provide a novel relatively inexpensive self-contained and substantially frictionless seal assembly adapted to positively prevent passage of material between relatively rotating machine parts, particularly brake parts.

A further object of this invention is to provide a novel brake assembly having an improved seal interposed between a relatively rotatable brake drum and an axle mounted part of such an assembly.

Another object of this invention is to provide an adapter for a seal between the brake drum and the brake mechanism mounting plate of an automotive brake which is so constructed and arranged as to permit the inspection or the adjustment of the mechanism without disassembling or removing the seal assembly.

A further object of the invention is to provide a novel seal assembly between two relatively rotatable machine parts which substantially eliminates the effect of misalignment between the relatively rotatable seal parts.

These and other objects of this invention will become apparent as the following detailed description of the preferred embodiment of this invention proceeds in connection with the appended claims and in reference to the accompanying drawings wherein:

Figure 1 is a diametral sectional view of a sealed automotive wheel brake assembly embodying my invention;

Figure 2 is an enlarged sectional view showing in detail the seal assembly construction and its mounting; and Figure 3 is a sectional view showing the finger spring construction of the seal assembly taken along the lines 3—3 of Figure 2.

The brake assembly comprising the preferred embodiment of the invention is mounted at the outer end of a vehicle axle as illustrated in Figure 1. A brake drum 10 of conventional structure is secured through an adapter 11 and bolts 12 upon a wheel hub 13 journalled upon an axle housing 14 as by an anti-friction bearing 15. A conventional brake mechanism 16 is mounted on a backing plate 17 rigidly secured as by bolts 18 to a brake mechanism mounting flange 19 that may be integral with the axle housing 14. Brake mechanism 16 comprises a pair of brake shoes 21, but one of which is shown in Figure 1. Each shoe 21 is pivotally mounted on an anchor bolt 22 on the backing plate 17 and connected to brake shoe actuating mechanism 23 at its opposite end.

A lubricant seal annulus 24, which is preferably that disclosed in United States Letters Patent No. 2,391,007 issued December 18, 1947, to Lawrence R. Buckendale, is fixed to the axle housing for coaction with the outer race of the inner hub bearing 15 to prevent entrance of lubricant into brake drum 10 through the bearing 15. This drum and brake shoe mechanism structure is conventional and it is to the prevention of the entrance of dirt, water and other foreign material into the interior of drum 10 through its open end and the prevention of the saturation of linings on brake shoes 21 that the present invention is chiefly directed.

During movement of the vehicle, brake drum 10 which is fixed to the associated vehicle wheel rotates with respect to the backing plate 17, a narrow annular clearance indicated at 25 existing between these parts. For ordinary conditions of operation this clearance space is not too objectionable. Usually an out-turned annular lip is provided on the periphery of plate 17 to deflect dust, water and mud thrown up by the wheels, as is shown for example by the aforesaid Alden et al. patent, but when brake mechanisms such as those that are applied to vehicles, particularly military vehicles which are subjected in operation to fording of streams or similar conditions, clearance space 25 permits the entry of water and solid matter into the brake mechanism.

The present invention contemplates the provision of a positive closure which is effective to prevent the entry of water and mud through space 25 but which does not interfere with rotation of drum 10 relative to the axle housing and other relatively fixed parts.

My novel sealing closure for the end of drum 10 comprises oppositely radially extending parts secured to the drum and axle housing respectively. Their adjacent peripheries interfit in an annular seal structure that permits relative substantially friction-free rotation of the parts but bars the passage of dirt or water toward the interior of drum 10. One of these parts, here the drum-mounted part, contains an annular flexible section indicated at 26 in Figure 1 for facilitating assembly and compensating for misalignment in the assembly as will appear.

The closure part secured to the axle housing comprises preferably a stamped sheet metal ring 27 that is pressed onto and surrounds flange 19, one leg being clamped between plate 17 and flange 19 as by bolts 18. The other leg 28 of ring 27 defines a cylindrical surface about flange 19. A stamped sheet metal wiper ring 29 which is L-shaped in cross section has one leg pressed over leg 28, and its other leg 31 projecting radially outwardly to provide the inner component of the seal as will appear. If desired, leg 28 of ring 27 may be integral with wiper ring 29.

The closure part fixed to the brake drum comprises a sheet metal adapter ring 32 secured at its outer periphery to drum 10 as by bolts 33, a sheet metal inner ring 34 and an intermediate resilient ring 35 of rubber, neoprene, or the like that is U-shaped in cross-section. Ring 35 is secured as by vulcanizing to the adjacent peripheries of rings 32 and 34.

Ring 34 is formed at its inner periphery with a recessed shoulder 36 wherein is mounted a sheet metal retainer ring 37 having a leg 38 pressed against the shoulder of ring 34 and a leg 39 projecting radially inwardly to terminate short of ring 27 on the axle housing. At the inner end of leg 38 is an annular flange 41. A pair of annular sheet metal stampings 42 and 43, secured to flange 41 and leg 39 respectively, project substantially parallel to each other radially inwardly to terminate short of the rings secured to the axle housing. Stampings 42 and 43 are equidistantly disposed on opposite sides of leg 31 of ring 29.

A pair of flexible annular sealing members 44 and 45 are mounted on the drum carried closure part and adapted to engage the opposite flat parallel radial side surfaces 46 and 47 of the ring leg 31 in the assembly. These sealing members are preferably of identical construction and reversed in the assembly, each comprising an annular sheet metal finger spring element 48 having an annular body 49 of rubber, neoprene or the like bonded to it. The outer peripheries of members 48 are clamped between stampings 42 and 43 and an annular spacer block 51. The rubber bodies 49 are substantially L-shaped in cross-section with their thicker inner portions having sharp continuous lips 52 and 53 respectively bearing on surfaces 46 and 47. Elements 48 function as finger springs backing the rubber bodies 49 and acting axially for urging lips 52 and 53 uniformly and constantly against the relatively rotating ring leg 31.

In the above described assembly all of parts 37, 42, 43 and 51 are rigidly connected in the assembly and with sealing members 44 and 45 and the leg 31 of ring 29 define a closed toroidal chamber 54. This chamber 54 in the invention is filled with a suitable fluent or plastic sealing material which traps and prevents passage of foreign matter therethrough and which has lubricating characteristics so that it offers almost no frictional resistance to relative rotation of leg 31 and the other chamber parts.

The material filling chamber 54 must not be so liquid that it will escape freely past lips 52 and 53, and it must be a stable reasonably viscous compound that will not thin, thicken, expand, contract, freeze, boil or otherwise change its physical condition appreciably when exposed to the very high and low temperatures incident to normal vehicle brake operation. It must be water repellant and must not react with rubber or the metals of chamber walls. I have found that the class of compounds known as silicones is admirably suited for the purpose but there are probably others equally stable.

Silicones of almost any desired viscosity can be obtained through controlled polymerization and mixtures of different polymers. The more viscous silicones are usually called the greases. Fillers inert with respect to the enclosures may also be included to improve the sealing action and maintain viscosity and stability against deterioration by heat or shear during operation. The preferred viscosity here is about that of ordinary cup grease.

As illustrated in Figure 2, stampings 42 and 43 have intermediate outwardly recessed portions for accommodating the seal bodies 49 and permitting any relative movement therebetween. At the bottom of leg 31, stampings 42 and 43 are crimped inwardly to define a reasonably narrow throat 55 which serves as a baffle limiting passage of any material into or out of the seal assembly.

An outer sealing element 56 is fixedly mounted in an annular space between ring leg 39 and shoulder 57 on stamping 43. It comprises a cylindrical ring 58 of felt bonded to and laminated between two thinner rings 59 and 60 of flexible sheeting such as synthetic rubber. The felt member 58 is saturated with a high melting point grease or a silicone grease to insure low friction wiping contact with surface 61. The purpose of this seal is an initial baffle against entry of water and dirt into the drum assembly.

An aperture 62 is provided in adapter ring 32 for access to adjust the brake mechanism. This aperture is closed by a plate 63 fastened to ring 32 as by bolts 64, a rubber gasket 65 sealing the edges of the aperture.

In assembly and installation, the retainer ring 37 and the chamber defining and sealing parts mounted thereon are combined with ring 29, with leg 31 slidably projecting between the sealing members 44 and 45 into chamber 54. The retainer ring 37 is then pressed into shoulder 36 of the closure ring 34, thereby mounting the sealing assembly on the closure. Wiper ring 29 is rigidly assembled with Z-shaped ring 27 by pressing it onto the cylindrical leg 28. This entire sub-assembly is slipped over the outer end of the axle 14 and pressed into position over flange 19. The brake mounting plate 17 is then placed in position, and ring 27 and the brake mounting plate are secured to flange 19 as by bolts 18. The brake mechanism 16 is then installed on plate 17 and the brake drum 10 secured in position over the brake mechanism. Drum 10 is then drawn into tight engagement with adapter ring 32 by bolts 33, and the drum secured to the wheel hub through adapter 11. The flexible ring section 35 permits axial deformation of the closure during this operation, without in any way affecting the seal assembly.

In operation, outer sealing element 56 forms a first barrier to the passage of dirt or water into the interior of the drum since it rotates with the vehicle wheel and lies in annular surface wiping contact with the relatively stationary cylindrical surface 61 of the axle mounted seal component. Any foreign matter penetrating outer sealing element 56 must pass lip 53 before entering chamber 54. The spring biased contact of lip 53 against the surface 47 effectively baffles the passage of foreign matter into the chamber 54 and the envelopment of leg 31 by the water repellant stable silicone grease in the chamber prevents the passage of any liquid therethrough. Chamber 54 thus provides a trap for foreign matter which cannot escape because of the spring pressed lip 52.

During rotation of the wheel the relatively stationary leg 31 is disposed in uniform wiping contact with the lips 52 and 53 of the resilient seal members. This contact of lips 52 and 53 with surfaces 46 and 47 is continuous and annular, the width of the contact annulus depending upon the strength of the springs 48, and this contact is substantially frictionless because of the presence of thin films of the silicone grease material from chamber 54 between the lips and surfaces 46 and 47. Wear is automatically taken up by the spring rings, so that the life of the seal is very long. There is no tendency of the grease to escape when the wheel is stationary, because of its viscosity, and centrifugal force tends to keep the sealing material in chamber 54 during rotation of the wheel.

The invention may be embodied in other specific forms without departing from the the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A sealed vehicle brake assembly comprising a relatively non-rotatable axle member, a brake drum, means at one end of said brake drum for closing that end and mounting said brake drum for rotation about said axle member, brake mechanism mounted on said axle member within said brake drum for coaction therewith and means at the opposite end of said brake drum for preventing entrance of foreign material into said brake drum interior comprising interfitting seal components mounted on the brake drum and the axle member respectively, one of said seal components comprising a radially projecting rigid annulus and the other of said seal components comprising means defining an annular chamber apertured along its inner periphery for receiving said projecting annulus, a body of viscous sealing material having lubricating properties in said chamber disposed about the periphery of said annulus, the inner periphery of said chamber defining means comprising annular resilient members engaging opposite side surfaces of said annulus and springs backing said resilient members for maintaining them in contact with said annulus during all conditions of relative rotation of said brake drum and axle member.

2. A sealed vehicle brake assembly comprising a relatively non-rotatable axle member, a brake drum, means at one end of said brake drum for closing that end and mounting said brake drum for rotation about said axle member, brake mechanism mounted on said axle member within said brake drum for coaction therewith, and interfitting seal components mounted on the brake drum and the axle member respectively, one of said seal components comprising a radially projecting annulus and the other of said seal components comprising means defining an annular chamber apertured for receiving said projecting annulus and a body of viscous sealing material in said chamber disposed about the periphery of said annulus, said chamber defining means including annular spring backed resilient bodies having lips extending toward each other to slidingly engage opposite sides of said annulus over narrow annular areas in fluid tight relation during all conditions of relative rotation of the axle member and brake drum.

3. A vehicle brake assembly comprising an axle member, a brake drum member, means at one end of the brake drum member for closing that end of the drum member and mounting it for relative rotation with respect to said axle member, brake mechanism on said axle member adapted to coact with said drum member, and means at the other end of said brake drum member for sealing against the entry of foreign matter interiorly of the drum comprising a rigid annular part projecting substantially radially from one of said members and means on the other of said members defining an annular chamber having a peripheral wall through which extends said rigid annular part, a body of viscous material having lubricating properties within said chamber in contact with opposite sides of said part, said wall comprising annular resilient members engaging opposite sides of said part, and resilient means constantly urging and maintaining said resilient members against said part during all conditions of relative rotation of said members.

4. In the assembly defined in claim 3, said viscous material being a silicone grease.

5. In the assembly defined in claim 3, said annular resilient members comprising annular bodies of rubber or the like formed with lips having relatively narrow area annular contact with opposite sides of said part.

6. A vehicle brake assembly comprising an axle member, a brake drum, means at one end of the brake drum for closing that end of the drum and mounting it for relative rotation with respect to the axle member, coacting brake mechanism on said axle member enclosed by said drum, and coacting seal components at the other end of said drum sealing against entry of foreign matter interiorly of the drum, one of said seal components comprising an annular flange radially projecting from said axle member and the other of said seal components comprising means defining a chamber having a continuously apertured inner peripheral wall through which projects said flange, said wall comprising annular resilient bodies engaging opposite sides of said flange and continuously maintained in fluid tight engagement therewith during all conditions of relative rotation of the seal components, and rigid means on said other seal component extending inwardly of said chamber to provide a relatively narrow continuous baffle passage of fixed width through which said flange projects freely radially inwardly of said chamber.

References Cited in the file of this patent

UNITED STATES PATENTS

| | | |
|---|---|---|
| 1,158,719 | Reynolds | Nov. 2, 1915 |
| 1,493,768 | Rice | May 13, 1924 |
| 1,617,549 | Schramm | Feb. 15, 1927 |
| 1,995,691 | Stough et al. | Mar. 26, 1935 |
| 2,377,452 | Reynolds | June 5, 1945 |
| 2,407,285 | King | Sept. 10, 1946 |
| 2,554,301 | House | May 22, 1951 |